(12) United States Patent
Nakamura

(10) Patent No.: US 10,768,869 B2
(45) Date of Patent: Sep. 8, 2020

(54) IMAGE PROCESSING APPARATUS AND IMAGE PROCESSING METHOD

(71) Applicant: CANON KABUSHIKI KAISHA, Tokyo (JP)

(72) Inventor: Hironori Nakamura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/356,471

(22) Filed: Mar. 18, 2019

(65) Prior Publication Data

US 2019/0294384 A1  Sep. 26, 2019

(30) Foreign Application Priority Data

Mar. 26, 2018 (JP) ................................ 2018-058659

(51) Int. Cl.
*G06F 3/12* (2006.01)
*G06K 15/02* (2006.01)

(52) U.S. Cl.
CPC ............ *G06F 3/122* (2013.01); *G06F 3/1242* (2013.01); *G06F 3/1279* (2013.01); *G06K 15/1817* (2013.01)

(58) Field of Classification Search
CPC .. G06K 15/1817; G06F 3/1279; G06F 3/1242
USPC ....................................................... 358/1.16
See application file for complete search history.

(56) References Cited

U.S. PATENT DOCUMENTS

| 9,533,492 B2 | 1/2017 | Murasawa | |
|---|---|---|---|
| 2003/0142156 A1* | 7/2003 | Sato | B41J 29/393 347/9 |
| 2006/0203817 A1* | 9/2006 | Fujiwara | H04N 1/0083 370/389 |
| 2016/0297191 A1* | 10/2016 | Murasawa | B41J 2/04586 |

FOREIGN PATENT DOCUMENTS

JP  2016-198967  12/2016

OTHER PUBLICATIONS

U.S. Appl. No. 16/362,372, filed Mar. 22, 2019 by Tatsunori Sasaki et al.

* cited by examiner

*Primary Examiner* — Jacky X Zheng
(74) *Attorney, Agent, or Firm* — Venable LLP

(57) ABSTRACT

According to an embodiment of this invention, an image processing apparatus generates image data to be used to print an image on a print medium, based on a print job transmitted from a host, generates first print data by performing image processing on part of the generated image data, stores the first print data in a first memory, generates second print data by performing image processing on a remaining part of the generated image data, and stores the second print data in a second memory. The apparatus further transfers the first print data from the first memory to the second memory, composes the first print data and the second print data stored in the second memory, and transfers the composite data as print data to a continuous area of a third memory.

20 Claims, 15 Drawing Sheets

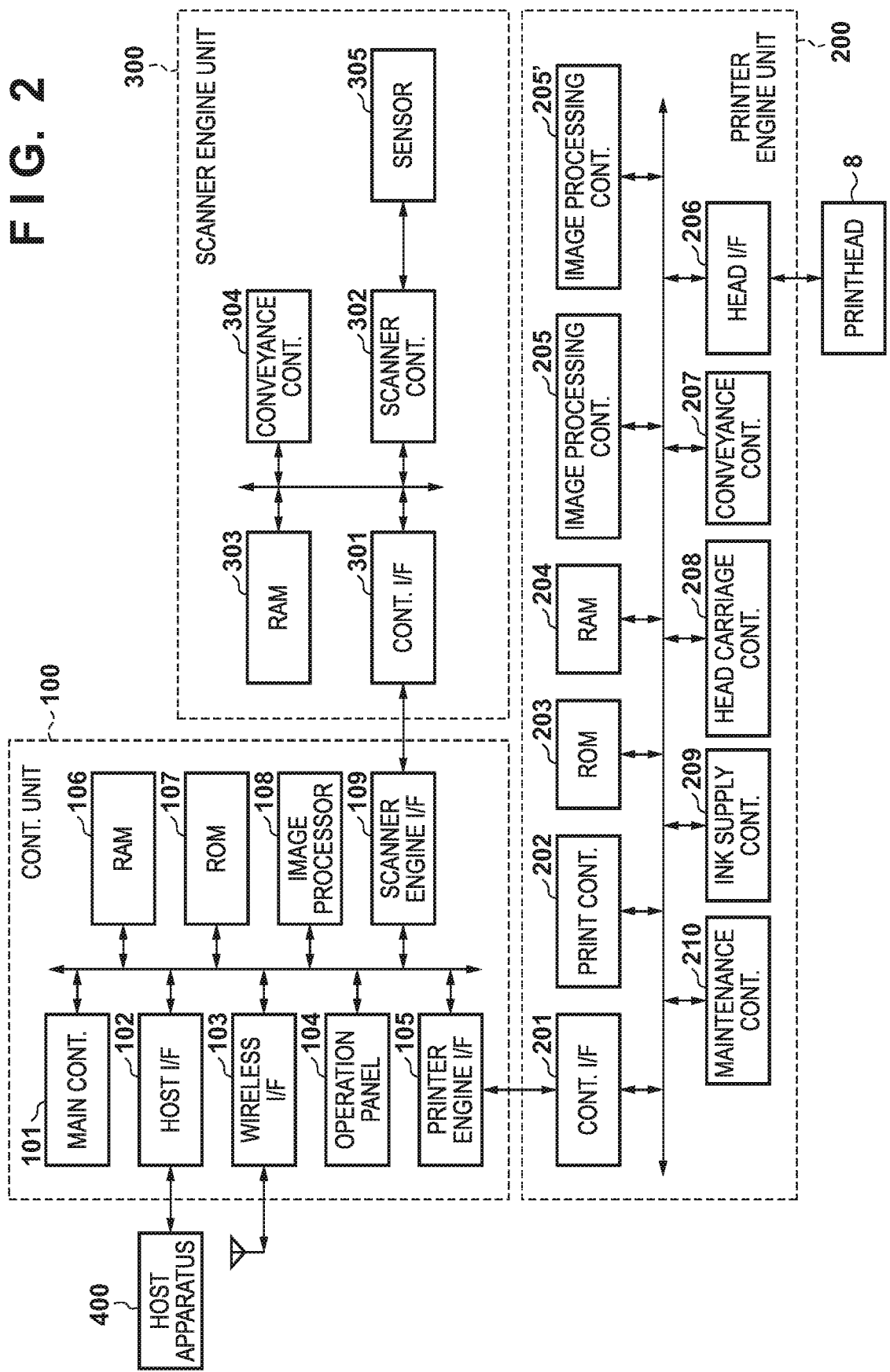

PRINTHEAD

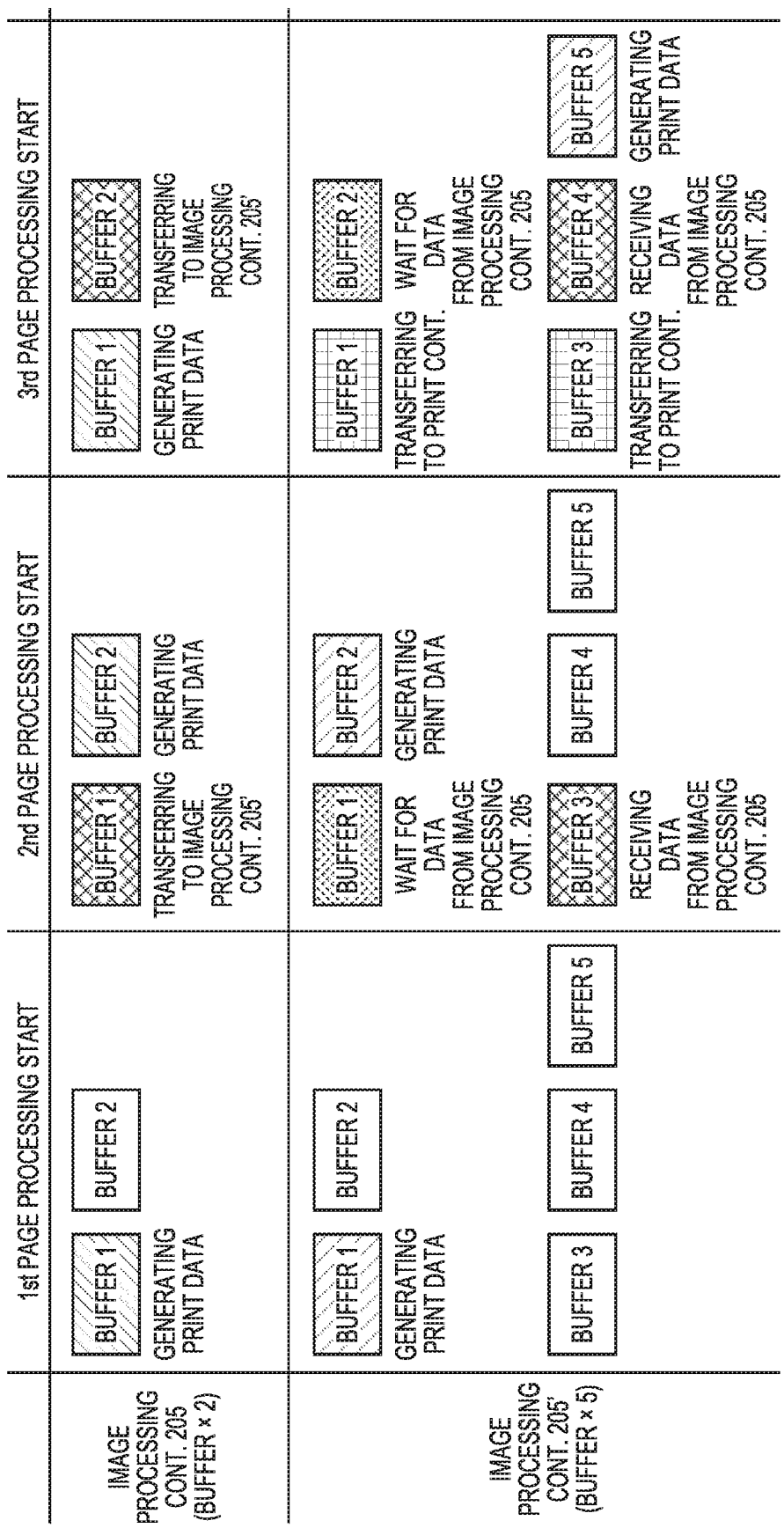

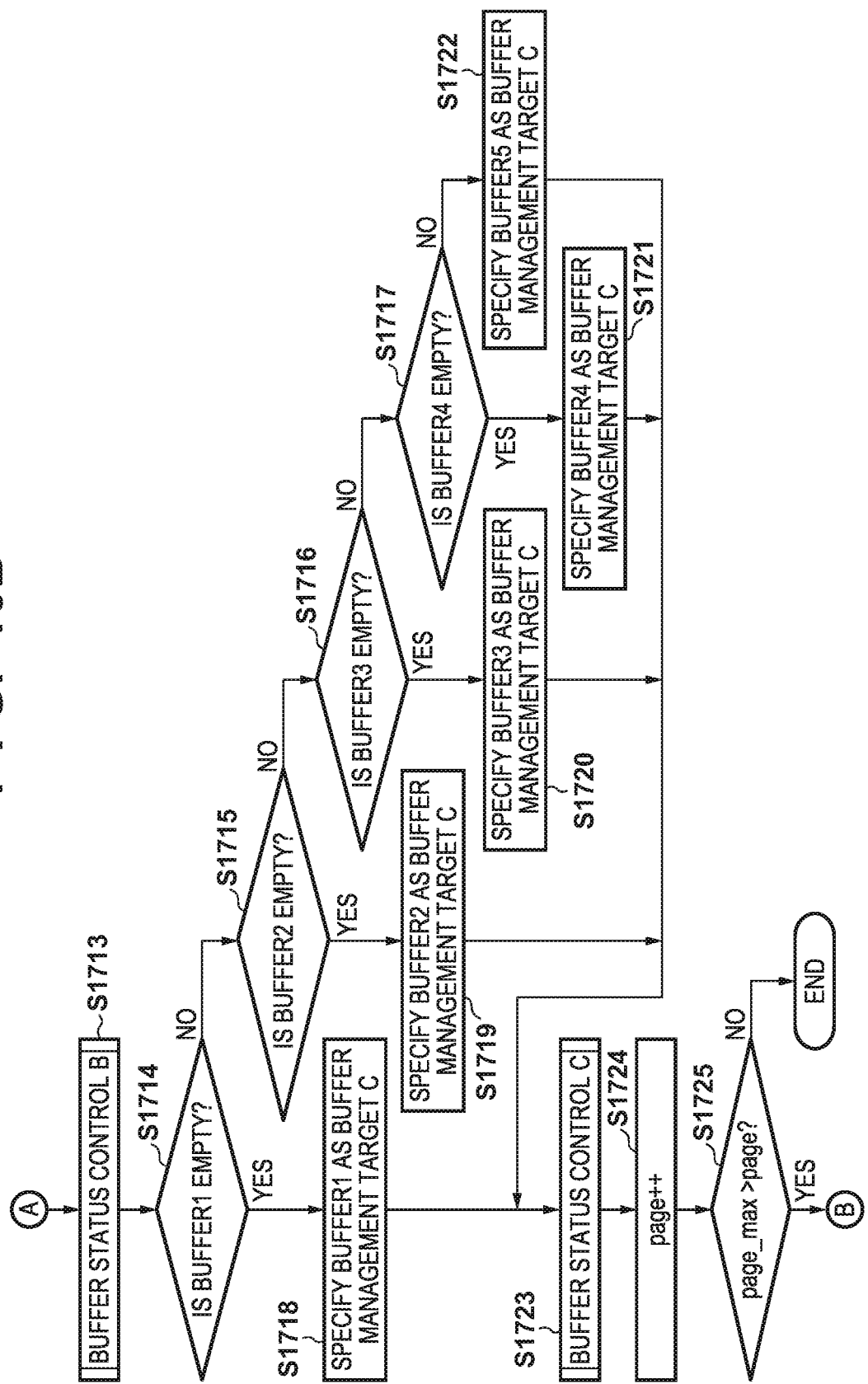

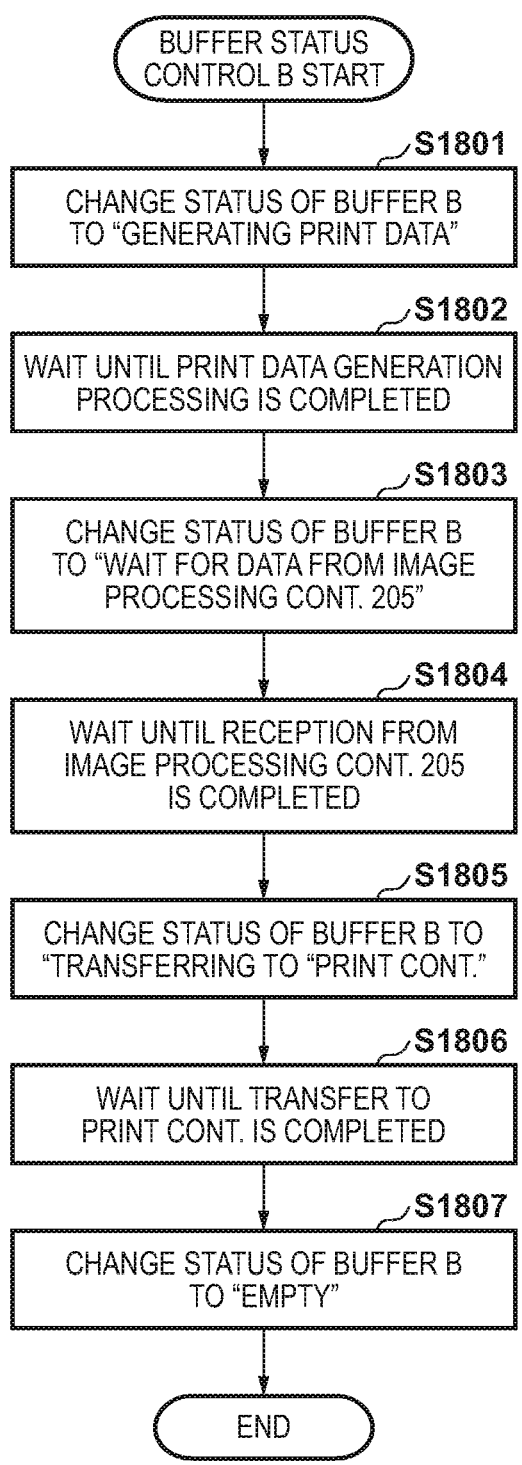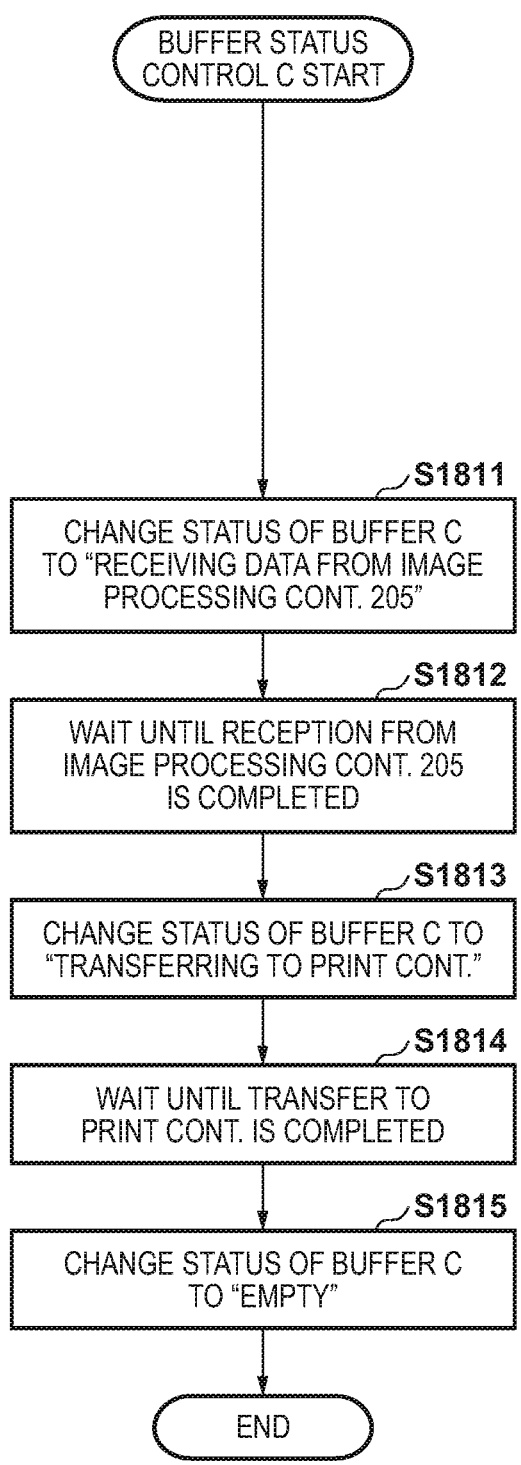

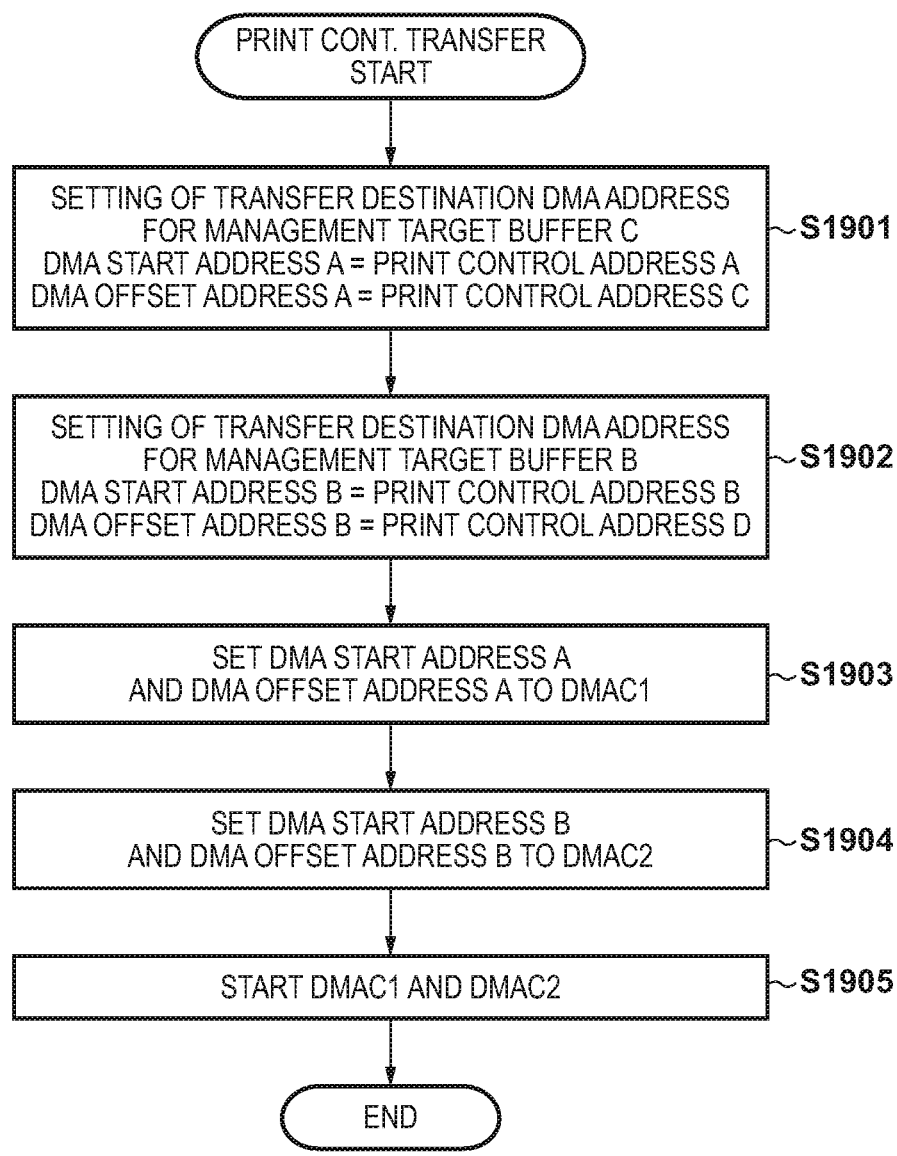

IMAGE PROCESSING APPARATUS AND IMAGE PROCESSING METHOD

BACKGROUND OF THE INVENTION

Field of the Invention

The present invention relates to an image processing apparatus and an image processing method, and particularly to, for example, image processing applied to a printing apparatus that uses, for printing, a printhead according to an inkjet method.

Description of the Related Art

Japanese Patent Laid-Open No. 2016-198967 discloses a technique in which image data is divided into areas and two image processing ASICs perform parallel processing for the image data divided into the areas.

However, Japanese Patent Laid-Open No. 2016-198967 discloses only a method of controlling, via the two image processing ASICs, the operation of a printhead based on the image data having undergone the parallel processing. Therefore, if the printhead is controlled by one image processing ASIC after parallel-distributed processing, the image data need to be aggregated in the one image processing ASIC. For data aggregation, a necessary memory capacity may increase. For example, as long as the image data are not continuously allocated on a memory in a direction perpendicular to the scanning direction of a carriage mounted with the printhead, it is impossible to efficiently transfer the image data to the printhead, thereby making it impossible to implement high-speed printing.

To solve this problem, it is necessary to compose the image data individually processed by the plurality of ASICs to be continuously allocated as one image data on the memory. To simply implement this, it is only necessary to ensure, in advance, a free capacity in the memory of the image processing ASIC in which the image data are aggregated. However, it is always necessary to ensure a memory capacity other than that necessary for processing in the ASIC, and it may be inefficient from the viewpoint of the use of the memory.

Furthermore, to perform data copy processing necessary to sort the data after data aggregation, a memory capacity necessary for the processing needs to be ensured, and DMA processing by the copy processing increases. The increase of the DMA processing indicates an increase in processing load, and this is not desirable in maintaining the system performance.

SUMMARY OF THE INVENTION

Accordingly, the present invention is conceived as a response to the above-described disadvantages of the conventional art.

For example, an image processing apparatus and an image processing method according to this invention are capable of efficiently aggregating, with a small memory capacity, print data individually processed by a plurality of image processing units, and composing the print data into one print data.

According to one aspect of the present invention, there is provided an image processing apparatus comprising: a generation unit configured to generate image data to be used to print an image on a print medium based on a print job transmitted from a host; a first image processing unit configured to generate first print data by performing image processing on part of the image data generated by the generation unit, and store the first print data in a first memory; a second image processing unit configured to generate second print data by performing image processing on a remaining part of the image data, and store the second print data in a second memory; a composition unit configured to compose the first print data and the second print data to generate print data to be output to an outside, and store the generated print data in a third memory; a first transfer unit configured to transfer the first print data from the first memory to the second memory; and a second transfer unit configured to transfer the first print data and the second print data stored in the second memory to a continuous area of the third memory.

According to still another aspect of the present invention, there is provided an image processing method comprising: generating image data to be used to print an image on a print medium based on a print job transmitted from a host; generating first print data by performing image processing on part of the generated image data, and storing the first print data in a first memory; generating second print data by performing image processing on a remaining part of the image data, and storing the second print data in a second memory; transferring the first print data from the first memory to the second memory; and composing the first print data and the second print data stored in the second memory, and transferring the composite data as print data to a continuous area of a third memory.

The invention is particularly advantageous since it is possible to aggregate print data individually processed by the plurality of image processing units without increasing the memory utilization, and compose the print data into one print data by efficiently aggregating the print data with a small memory capacity.

Further features of the present invention will become apparent from the following description of exemplary embodiments with reference to the attached drawings.

BRIEF DESCRIPTION OF THE DRAWINGS

FIG. 2 is a block diagram showing the control arrangement of the printing apparatus shown in FIG. 1;

FIGS. 8A and 8B are views exemplifying the state transition of each buffer of each of the two image processing controllers when image data to be used for printing of five cut sheets are processed;

FIGS. 10A and 10B are flowcharts illustrating buffer control for changing the state of buffer management of the image processing controller 205';

FIGS. 11A and 11B are flowcharts each illustrating buffer status control of the image processing controller 205'; and FIG. 12 is a flowchart illustrating processing when the image processing controller 205' transfers print data to a print controller 202.

DESCRIPTION OF THE EMBODIMENT(S)

Exemplary embodiment(s) of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "print element (to be also referred to as a "nozzle" hereinafter)" generically means an ink orifice or a liquid channel communicating with it, and an element for generating energy used to discharge ink, unless otherwise specified.

An element substrate for a printhead (head substrate) used below means not merely a base made of a silicon semiconductor, but an arrangement in which elements, wirings, and the like are arranged.

Further, "on the substrate" means not merely "on an element substrate", but even "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

<Printing Apparatus Mounted with Full-Line Printhead (FIG. 1)>

Figure 1:
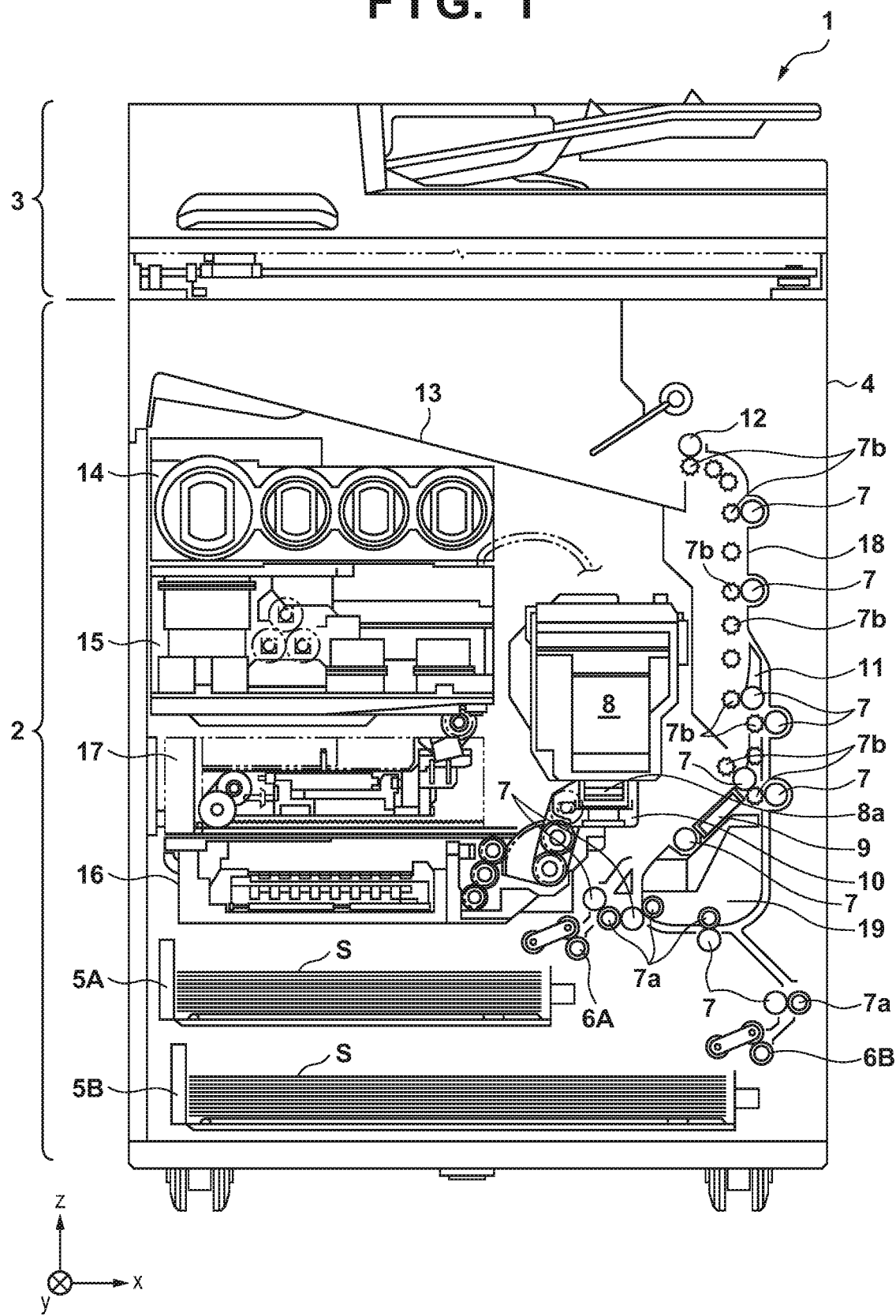
FIG. 1 is a side sectional view for explaining the structure of a printing apparatus including a printhead according to an exemplary embodiment of the present invention.

FIG. 1 is a side sectional view showing the internal arrangement of an inkjet printing apparatus (to be referred to as a printing apparatus hereinafter) according to an exemplary embodiment of the present invention. In FIG. 1, the Y direction, the X direction (a direction perpendicular to a sheet surface), and the Z direction indicate a horizontal direction, the array direction of a plurality of nozzles provided in an inkjet printhead (to be referred to as a printhead hereinafter) 8, and a vertical direction, respectively.

A printing apparatus 1 is a multi-function peripheral that includes a print unit 2 and a scanner unit 3, and can execute various processes related to a print operation and a reading operation in the print unit 2 and the scanner unit 3 individually or in synchronism with each other. The scanner unit 3 includes an ADF (automatic document feeder) and an FBS (flatbed scanner), can read an original automatically fed by the ADF, and can read (scan) an original placed on a document table of the FBS by a user. Note that although the multi-function peripheral including the print unit 2 and the scanner unit 3 has been exemplified in this embodiment, the scanner unit 3 need not be provided. FIG. 1 shows a standby state in which the printing apparatus 1 performs neither the print operation nor the reading operation.

In the print unit 2, a first cassette 5A and a second cassette 5B for containing print media (cut sheets) S are detachably installed in a lower bottom portion of a housing 4 in a vertical direction. Relatively small print media of sizes up to A4 size are simply stacked in the first cassette 5A, and relatively large print media of sizes up to A3 size are simply stacked in the second cassette 5B. A first feeding unit 6A configured to separate and feed the contained print media one by one is provided near the first cassette 5A. Similarly, a second feeding unit 6B is provided near the second cassette 5B. Each print medium S is selectively fed from one of the cassettes when a print operation is performed.

Conveyance rollers 7, a discharge roller 12, pinch rollers 7a, spurs 7b, a guide 18, an inner guide 19, and a flapper 11 are conveyance mechanisms for guiding the print medium S in a predetermined direction. The conveyance rollers 7 are arranged on the upstream and downstream sides of the printhead 8 with respect to the conveyance direction of the print medium, and are driven by a conveyance motor (not shown). The pinch rollers 7a are driven rollers that rotate while nipping the print medium S together with the conveyance rollers 7. The discharge roller 12 is arranged on the downstream side of the conveyance rollers 7 with respect to the conveyance direction of the print medium, and is driven by a conveyance motor (not shown). The spurs 7b clamp and convey the print medium S together with the discharge roller 12 and the conveyance rollers 7 arranged on the downstream side of the printhead 8 with respect to the conveyance direction of the print medium.

The guide 18 is provided in the conveyance path of the print medium S and guides the print medium S in a predetermined direction. The inner guide 19 is a member extending in the Y direction, has a curved side surface, and guides the print medium S along the side surface. The flapper 11 is a member for switching the conveyance direction of the print medium S when a double-sided print operation is performed. A discharge tray 13 is a tray for stacking each print medium S that has undergone the print operation and has been discharged by the discharge roller 12.

The printhead 8 is a full-line printhead capable of performing color printing in accordance with the inkjet method. In the printhead 8, a plurality of orifices for discharging ink in accordance with print data, the number of which corresponds to the width of the print medium S, are arrayed along the Y direction in FIG. 1. When the printhead 8 is located at a standby position, an orifice surface 8a of the printhead 8 faces downward in the vertical direction, and is capped by a cap unit 10, as shown in FIG. 1. When a print operation is performed, a print controller 202 (to be described later) changes the direction of the printhead 8 so that the orifice surface 8a faces a platen 9. The platen 9 is formed by a flat plate extending in the Y direction, and supports, from the back surface of the print medium S, which is to undergo a print operation by the printhead 8.

Ink tank units 14 individually contain four color inks to be supplied to the printhead 8. An ink supply unit 15 is provided in the middle of a channel connecting the ink tank units 14 and the printhead 8 and adjusts the pressure and the flow rate of ink in the printhead 8 to fall within appropriate ranges. This embodiment adopts a circulation type ink supply method as an ink supply method, and the ink supply unit 15 adjusts the pressure of the ink supplied to the printhead 8 and the flow rate of the ink collected from the printhead 8 to fall within appropriate ranges.

A maintenance unit 16 includes the cap unit 10 and a wiping unit 17 and executes a maintenance operation on the printhead 8 by causing these units to operate at a predetermined timing.

FIG. 2 is a block diagram showing the control arrangement of the printing apparatus 1.

The printing apparatus 1 is controlled when a printer engine unit 200 that generally controls the print unit 2, a scanner engine unit 300 that generally controls the scanner unit 3, and a controller unit 100 that generally controls the overall printing apparatus 1 cooperate with each other. The print controller 202 controls the various mechanisms of the printer engine unit 200 in accordance with an instruction from a main controller 101 of the controller unit 100. The various mechanisms of the scanner engine unit 300 are controlled by the main controller 101 of the controller unit 100.

The control arrangement will be described in detail below.

In the controller unit 100, the main controller 101 formed by a CPU controls the overall printing apparatus 1 in accordance with programs and various parameters stored in a ROM 107 by using a RAM 106 as a work area. For example, when a print job is input from a host apparatus 400 via a host I/F 102 or a wireless I/F 103, image data received by an image processor 108 undergoes predetermined image processing in accordance with an instruction from the main controller 101. The main controller 101 then transmits the image data having undergone the image processing to the printer engine unit 200 via a print engine I/F 105.

Note that the printing apparatus 1 may obtain the image data from the host apparatus 400 via wireless communication or wired communication, or may obtain image data from an external storage device (USB memory or the like) connected to the printing apparatus 1. A communication method used for wireless communication or wired communication is not limited. For example, as a communication method to be used for wireless communication, Wi-Fi (Wireless Fidelity)® or Bluetooth® is applicable. Furthermore, as a communication method to be used for wired communication, USB (Universal Serial Bus) or the like is applicable. In addition, for example, when a read command is input from the host apparatus 400, the main controller 101 transmits this command to the scanner unit 3 via a scanner engine I/F 109.

An operation panel 104 is a mechanism for the user to perform an input/output operation for the printing apparatus 1. The user can instruct an operation such as a copy or scan operation, set a print mode, and recognize the information of the printing apparatus 1 via the operation panel 104.

In the printer engine unit 200, the print controller 202 formed by a CPU controls the various mechanisms included in the print unit 2 in accordance with programs and various parameters stored in a ROM 203 by using a RAM 204 as a work area. When various commands and image data are received via a controller I/F 201, the print controller 202 temporarily saves the received data in the RAM 204. The print controller 202 causes each of image processing controllers 205 and 205' to convert the saved image data into print data to be used in the print operation by the printhead 8. When the print data is generated, the print controller 202 causes, via a head I/F 206, the printhead 8 to execute a print operation based on the print data. At this time, the print controller 202 conveys the print medium S by driving, via a conveyance control unit 207, the feeding units 6A and 6B, the conveyance rollers 7, the discharge roller 12, and the flapper 11, all of which are shown in FIG. 1. Print processing is performed by executing the print operation by the printhead 8 in synchronism with the conveyance operation of the print medium S in accordance with an instruction from the print controller 202.

Note that an example in which the printer engine unit 200 includes the two image processing controllers (ASICs) 205 and 205', the one ROM 203, and the one RAM 204 has been exemplified. However, the number of image processing controllers (ASICs), the number of ROMs, and the number of RAMs provided in the printer engine unit 200 are not limited to them. For example, the number of image processing controllers may be three or more.

A head carriage control unit 208 changes the direction and the position of the printhead 8 in accordance with the operation state such as the maintenance state and the printing state of the printing apparatus 1. An ink supply control unit 209 controls the ink supply unit 15 so that the pressure of ink supplied to the printhead 8 falls within an appropriate range. A maintenance control unit 210 controls the operations of the cap unit 10 and the wiping unit 17 in the maintenance unit 16 when a maintenance operation is performed on the printhead 8.

In the scanner engine unit 300, the main controller 101 controls the hardware resources of a scanner controller 302 in accordance with programs and various parameters stored in the ROM 107 by using the RAM 106 as a work area. Thus, the various mechanisms included in the scanner unit 3 are controlled. For example, when the main controller 101 controls the hardware resources in the scanner controller 302 via a controller I/F 301, an original that has been loaded onto the ADF by the user is conveyed via a conveyance control unit 304 and read by a sensor 305. Subsequently, the scanner controller 302 saves the read image data in a RAM 303.

Note that by converting the image data obtained in the above-described manner into print data, the print controller 202 can cause the printhead 8 to execute a print operation based on the image data read by the scanner controller 302.

In the above-described arrangement in which the printer engine unit includes the two image processing controllers, an example of dividing the image data generated by the controller unit and parallelly executing image processes by the two image processing controllers will be described below.

<Detailed Control Arrangement Related to Image Processing>

Figure 3A:
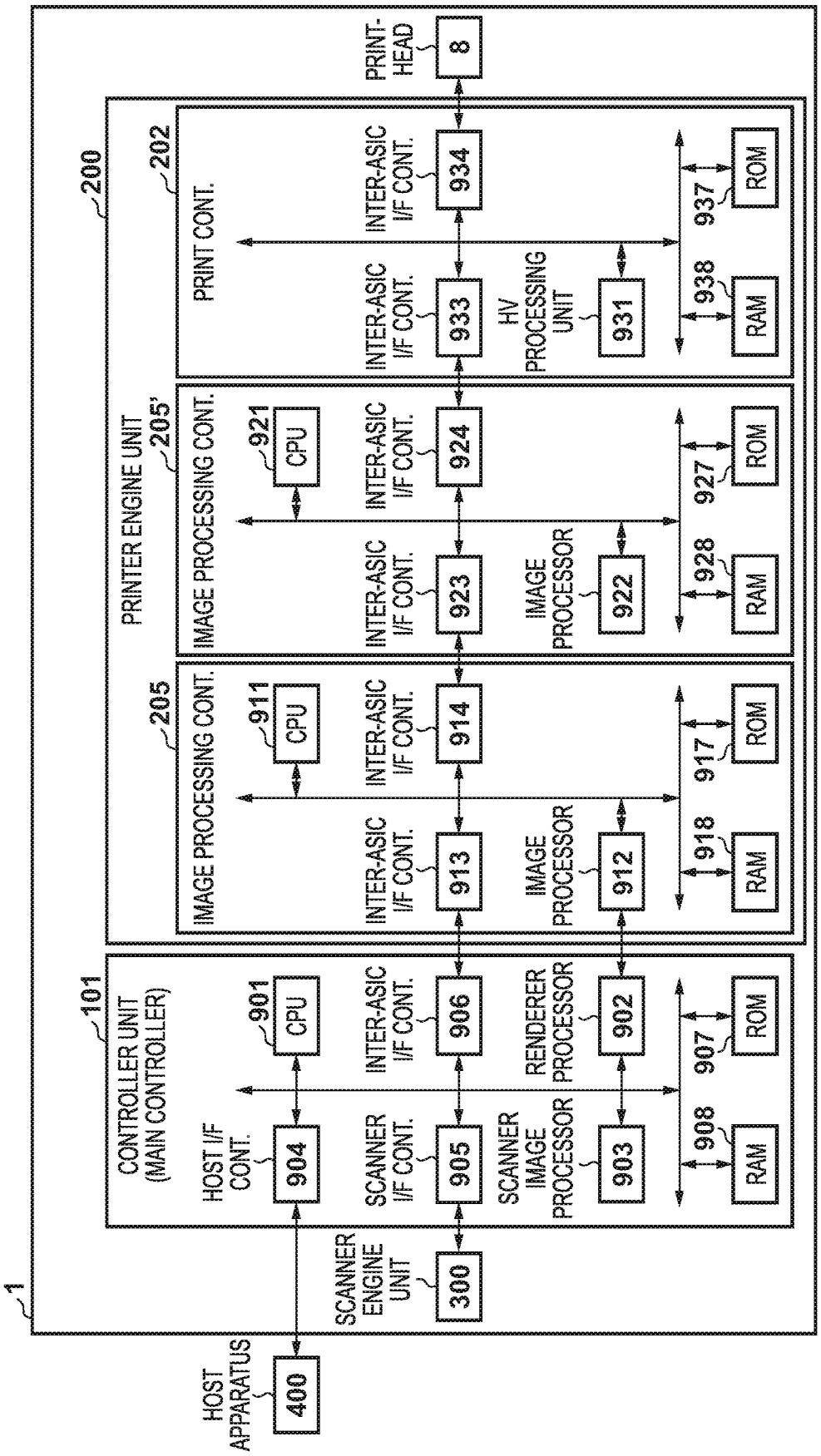
FIGS. 3A and 3B are block diagrams showing a detailed control arrangement, related to image processing, of the control arrangement shown in FIG. 2.
Figure 3B:
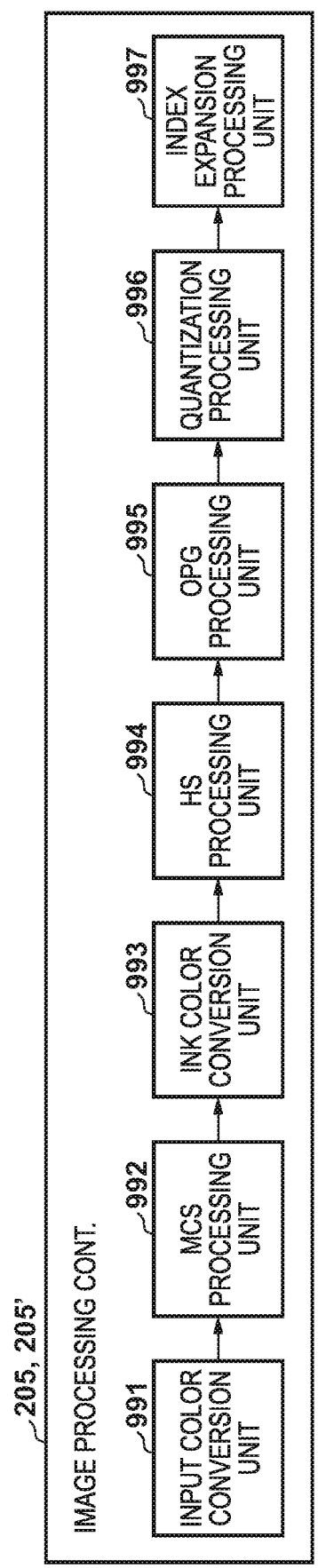

FIGS. 3A and 3B are block diagrams showing a detailed control arrangement related to image processing.

As shown in FIG. 3A, the printing apparatus 1 includes the controller unit 101 and the printer engine unit 200 formed from the image processing controllers 205 and 205' and the print controller 202. As described above, the printing apparatus 1 includes the four controllers related to image processing. First, the controller unit 101 functions as a main controller that generates image data on which each of the image processing controllers 205 and 205' performs image processing. Each of the image processing controllers 205 and 205' functions as a sub-controller for the controller unit 101. Note that the controller unit 101 includes a CPU 901, a ROM 907, and a RAM 908, the image processing controllers 205 includes a CPU 911, a ROM 917, and a RAM 918, the image processing controllers 205' includes a CPU 921, a ROM 927, and a RAM 928, and the print controller 202 includes a ROM 937, and a RAM 938.

The controller unit 101 executes, based on an input print job, processing of generating image data processable by the image processing controllers 205 and 205'. For example, a renderer processor 902 of the controller unit 101 generates image data for one page based on page description language (to be referred to as PDL hereinafter) data transmitted from the host apparatus 400 via a host I/F control unit 904. Furthermore, for example, a scanner image processor 903 generates image data for one page based on scan data transmitted from the scanner engine unit 300 via a scanner I/F control unit 905. The image data generated by the renderer processor 902 or the scanner image processor 903 is temporarily stored in a RAM 908 of the controller unit 101, and divided and transmitted to the image processing controller 205 or 205'.

An area of the RAM in which image data to be transmitted is stored will be referred to as a transmission buffer area hereinafter.

The image data stored in the transmission buffer area is transmitted to the image processing controller 205 via an inter-ASIC I/F control unit 906 and an inter-ASIC I/F control unit 913, and stored in a RAM 918 of the image processing controller 205. This transmission is controlled by a CPU 901. An area of the RAM in which the received image data is stored will be referred to as a reception buffer area hereinafter. Note that PCI Express (PCIe) is employed as an inter-ASIC I/F, and protocol processing and DMA control in PCIe are performed by the inter-ASIC I/F control unit.

A CPU 911 of the image processing controller 205 determines whether the image data stored in the reception buffer area of the RAM 918 is image data to undergo image processing (print data generation processing) of generating print data in the image processing controller 205. If it is determined that the stored image data is image data to undergo the print data generation processing in the image processing controller 205, the CPU 911 instructs an image processor 912 to generate print data based on the image data stored in the reception buffer area of the RAM 918. On the other hand, if it is determined that the stored image data is not image data to undergo the print data generation processing in the image processing controller 205, the CPU 911 transfers the image data stored in the reception buffer area of the RAM 918 to the image processing controller 205' via an inter-ASIC I/F control unit 914 and an inter-ASIC I/F control unit 923. This image data is stored in the reception buffer area of a RAM 928 of the image processing controller 205'.

The print data generated by the image processing unit 912 based on the image data stored in the reception buffer area of the RAM 918 is stored in the RAM 918. An area of the RAM in which the print data is stored will be referred to as a print buffer area hereinafter. The print data stored in the print buffer area of the RAM 918 is transmitted to the image processing controller 205' via the inter-ASIC I/F control unit 914, and stored in the print buffer area of the RAM 928.

An image processor 922 of the image processing controller 205' generates print data based on the image data stored in the reception buffer area of the RAM 928. The print data generated by the image processor 922 is stored in the print buffer area of the RAM 928. As described above, the print buffer area of the RAM 928 also stores print data generated by the image processing controller 205, and thus print data for one page is finally generated in the print buffer area.

Upon completion of generation of the print data for one page in the print buffer area of the RAM 928, a CPU 921 notifies the print controller 202 of the start of printing based on the print data for one page. After the notification, the CPU 921 transfers the print data stored in the print buffer area of the RAM 928 to the print controller 202 via an inter-ASIC I/F control unit 924 and an inter-ASIC I/F control unit 933. This data transfer processing is performed using DMA-transfer. To do this, a DMA controller (DMAC) is integrated. The print data transmitted to the print controller 202 is stored in a RAM 938.

After the image processing controller 205' notifies the print controller 202 of the start of printing, the print controller 202 receives the print data, and stores the received print data in the RAM 938. After that, an HV processing unit 931 executes HV-conversion processing on the print data stored in the RAM 938. The print data rearranged by the HV-conversion processing is stored in the RAM 938 again. The print controller 202 controls a print operation of forming an image on the print medium by transmitting via an inter-ASIC I/F control unit 934, to the printhead 8, the print data which has undergone the HV-conversion processing and has been stored in the RAM 938.

<Image Processing for Print Data Generation Executed by Image Processing Controller>

A series of image processes for print data generation, which is executed by the image processing controller 205 or 205', will be described.

FIG. 3B shows the arrangement of each of the image processing controllers 205 and 205'. As shown in FIG. 3B, each image processing controller includes an input color conversion processing unit 991, an MCS processing unit 992, an ink color conversion processing unit 993, an HS processing unit 994, an OPG processing unit 995, a quantization processing unit 996, and an index expansion processing unit 997. Processing executed by each component will be described in detail later with reference to FIG. 4.

Figure 4:
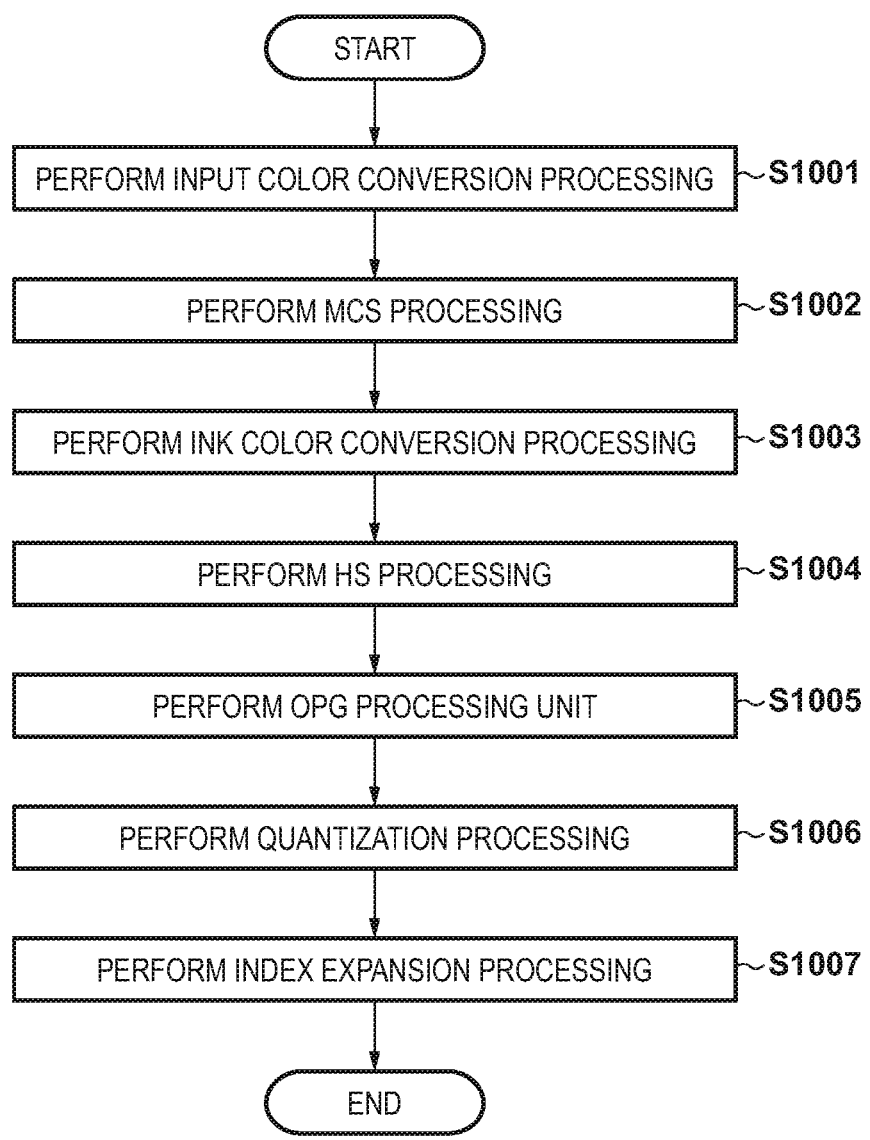
FIG. 4 is a flowchart illustrating a series of image processes executed by an image processing controller shown in FIGS. 2 to 3B.

FIG. 4 is a flowchart illustrating a series of image processes executed by each image processing controller.

In step S1001, the input color conversion processing unit 991 executes input color conversion processing of converting input image data into image data corresponding to the color gamut of the printing apparatus 1. The input image data are, for example, data indicating color coordinates (R, G, B) in a color space coordinate system such as sRGB as the expressed colors of a monitor. The input color conversion processing unit 991 converts the input image data of RGB color components each including 8 bits into image data (R', G', B') in the color gamut of the printing apparatus 1 by a known method such as matrix calculation processing or processing using a three-dimensional lookup table (to be referred to as a 3D LUT hereinafter). In this example, the input color conversion processing unit 991 performs input color conversion processing using the 3D LUT and interpolation calculation.

In step S1002, the multi-color shading (MCS) processing unit 992 executes MCS processing of correcting a difference in tint on the image data converted by the input color conversion processing unit 991, that is, the image data (R', G', B') in the color gamut of the printing apparatus 1. The MCS processing is processing of converting the image data for each unit area. In other words, the MCS processing is processing of correcting the RGB signals for each set of several nozzles by applying the same parameters to a plurality of continuous nozzles. As a result of the MCS processing, the image data (R', G', B') in the color gamut of the printing apparatus 1 are converted into image data (R", G", B"). In this MCS processing, the image data are converted for each unit area by executing conversion processing using a 3D LUT corresponding to each unit area among a plurality of 3D LUTs. By executing the MCS processing, it is possible to reduce a color difference derived from the variations of the discharge characteristics of the nozzles in the printhead 8, which cannot be corrected by only HS processing performed in subsequent step S1004.

In step S1003, the ink color conversion processing unit 993 executes ink color conversion processing of converting, into image data by ink color signal data, the image data (R", G", B") of RGB color components each including 8 bits processed by the MCS processing unit 992. Since the printing apparatus 1 uses black (K), cyan (C), magenta (M), and yellow (Y) inks, the image data of the RGB signals are converted into image data formed from color signals of KCMY color components each including 8 bits. Note that the ink color conversion processing in step S1003 is also performed using the 3D LUT and interpolation calculation, similar to the input color conversion processing in step S1001.

In step S1004, the head shading (HS) processing unit 994 executes head shading processing of converting the image data of the color signals of KCMY color components each including 8 bits into image data of ink color signals corresponding to the ink discharge amounts of the respective nozzles forming the printhead 8. In the HS processing, conversion processing is executed using a one-dimensional lookup table (to be referred to as an 1D LUT hereinafter) determined in accordance with the ink color and the position in the nozzle array direction.

In step S1005, the output gamma (OPG) processing unit 995 executes, for each ink color, on the image data of the 8-bit ink color signals which have undergone the HS processing, gamma-correction processing using the 1D LUT for OPG processing.

In step S1006, the quantization processing unit 996 executes quantization processing of reducing the grayscale level of the image data of the ink colors each expressed by 8 bits, that is, 256 values, which have undergone gamma-correction processing. Note that a method used for the quantization processing executed in step S1006 is not particularly limited. For example, an error diffusion method may be used or another pseudo-halftoning processing such as the dither method using a threshold matrix may be used.

In step S1007, the index expansion processing unit 997 executes, based on the image data whose grayscale level has been reduced in step S1006, index expansion processing of generating 1-bit binary data indicating printing "1" or non-printing "0".

The contents of the series of image processes for print data generation, which is executed by the image processing controller according to this embodiment, have been described.

<Restraint when Transferring Image Data from Controller Unit to Image Processing Controller>

As described above, the printer engine unit 200 includes the two image processing controllers. The printer engine unit 200 divides the image data generated by the controller unit 101, and causes the two image processing controllers to parallelly perform a series of image processes for the divided image data. When dividing the image data generated by the controller unit 101 and transferring the divided image data to the two image processing controllers, there are two noteworthy restraints to implement efficient processing without making the two image processing controllers idle.

The first restraint will be described.

Figure 5A:
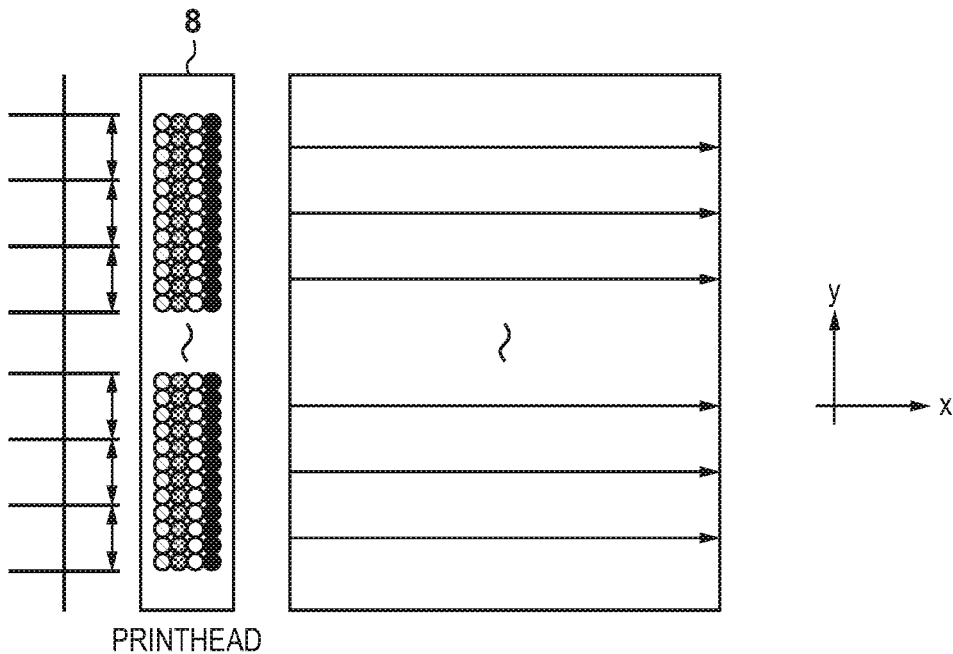
FIGS. 5A and 5B are views for explaining distributed processing by two image processing controllers.
Figure 5B:
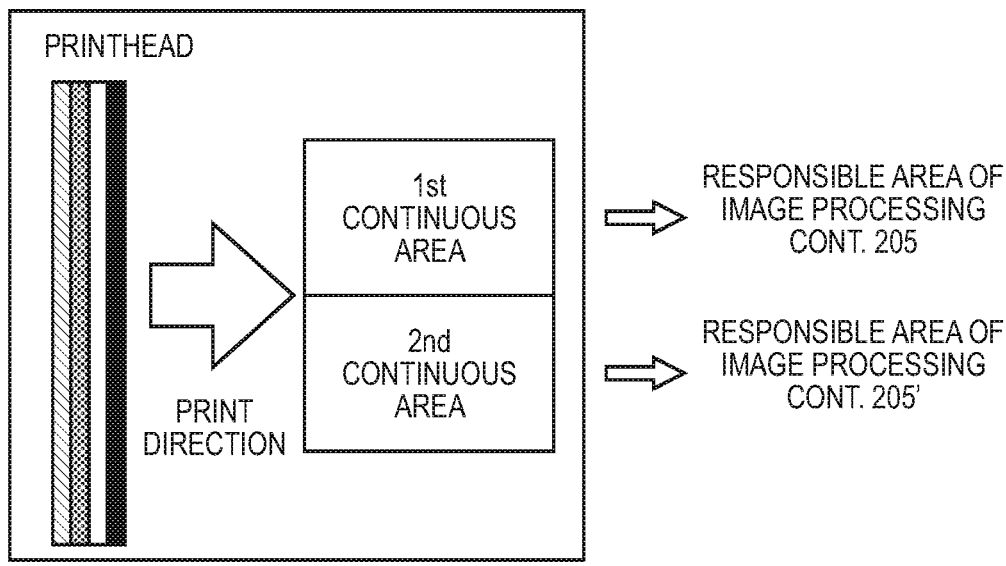

FIGS. 5A and 5B are views for explaining distributed processing by the two image processing controllers.

FIG. 5A is a view showing the positional relationship between the ideal HS processing direction and the array direction of the nozzles of each color ink in the printhead 8. As described above, the HS processing is image processing of correcting the signal value of each ink color for each set of a plurality of continuous nozzles (in this example, four nozzles). That is, since the parameters of the same table are applied for each set of the plurality of continuous nozzles in the HS processing, the ideal processing direction in the HS processing is a direction in which the table need not be switched midway, that is, a direction (x direction) perpendicular to the array direction (y direction) of the nozzles. Note that the same applies to the MCS processing. That is, the ideal processing direction in the MCS processing is also the direction (x direction) perpendicular to the array direction (y direction) of the nozzles.

Therefore, if the HS processing (or MCS processing) is executed from above in the x direction in FIG. 5A, the number of times the table is switched is smallest, and thus the processing efficiency is best. Therefore, the controller unit 101 desirably transmits the generated image data to the image processing controller 205 or 205' for each set of a plurality of nozzles, that is, each band.

Subsequently, the second restraint will be described.

FIG. 5B is a view showing the positional relationship among the array direction of the nozzles of each color ink in the printhead 8, the print direction, an area for which the image processing controller 205 performs the image processing, and an area for which the image processing controller 205' performs the image processing. The area for which the image processing controller 205 performs the image processing will be referred to as a responsible area of the image processing controller 205 hereinafter, and the area for which the image processing controller 205' performs the image processing will be referred to as a responsible area of the image processing controller 205' hereinafter.

The processing executed by the image processing controller 205 or 205' includes processing of referring to peripheral pixels, such as quantization processing using error diffusion. Therefore, from the viewpoint of the processing efficiency, the image data transferred from the controller unit 101 to the image processing controller desirably has continuity, that is, the image data is desirably image data of a continuous area. Therefore, in this embodiment, as shown in FIG. 5B, the upper half area of the image data for one page is set as the responsible area of the image processing controller 205, and the lower half area is set as the responsible area of the image processing controller 205'.

<Restraint when Performing HV-Conversion Processing in Print Controller>

The print controller 202 desirably performs HV-conversion processing on the print data stored in the RAM 938 without considering the boundary of the two areas divided by the image processing controllers 205 and 205'. More specifically, the print data have continuous addresses on the RAM 938 regardless of the boundary of the areas, and it is desirable to successively perform the DMA processing and the HV-conversion processing. If this is not supported, the number of times the DMA processing or the HV-conversion processing is activated increases, and overhead by software becomes large, thereby making it difficult to satisfy the system performance.

Figure 6A:
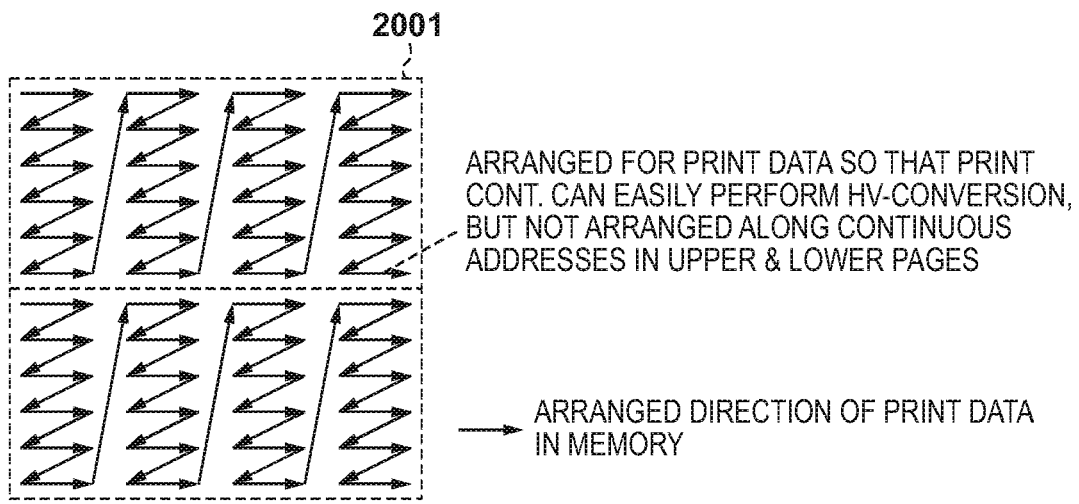
FIGS. 6A and 6B are views schematically showing the arrangement of image data for printing of one page in an image processing controller 205' and an image data arrangement in a print controller.
Figure 6B:
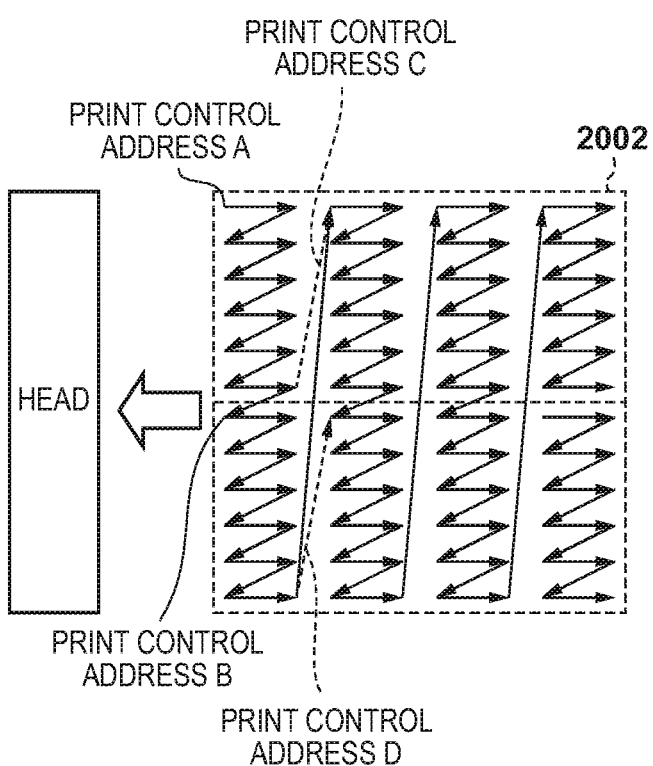

FIGS. 6A and 6B are views schematically showing the arrangement of the image data for printing of one page in the image processing controller 205' and the image data arrangement in the print controller.

FIG. 6A shows a case in which the upper and lower half areas of a data arrangement 2001 of the print data are not allocated at continuous addresses in the RAM 938.

Therefore, even after the processing of distributing the areas is performed, it is desirable to allocate the continuous print image on the RAM 938 while minimizing the memory capacity and the load of data processing as much as possible.

FIG. 6B shows a case in which an overall data arrangement 2002 of the print data is allocated at continuous addresses in the RAM 938.

<Buffer Control of Print Data in Two Image Processing Controllers>

The image processing controllers 205 and 205' according to this embodiment have a feature that buffer management control of the print data is executed and the print data is transmitted to the print controller under the above-described restraints. A series of processes related to the buffer management control and transmission of the print data will be described below.

Figure 7:
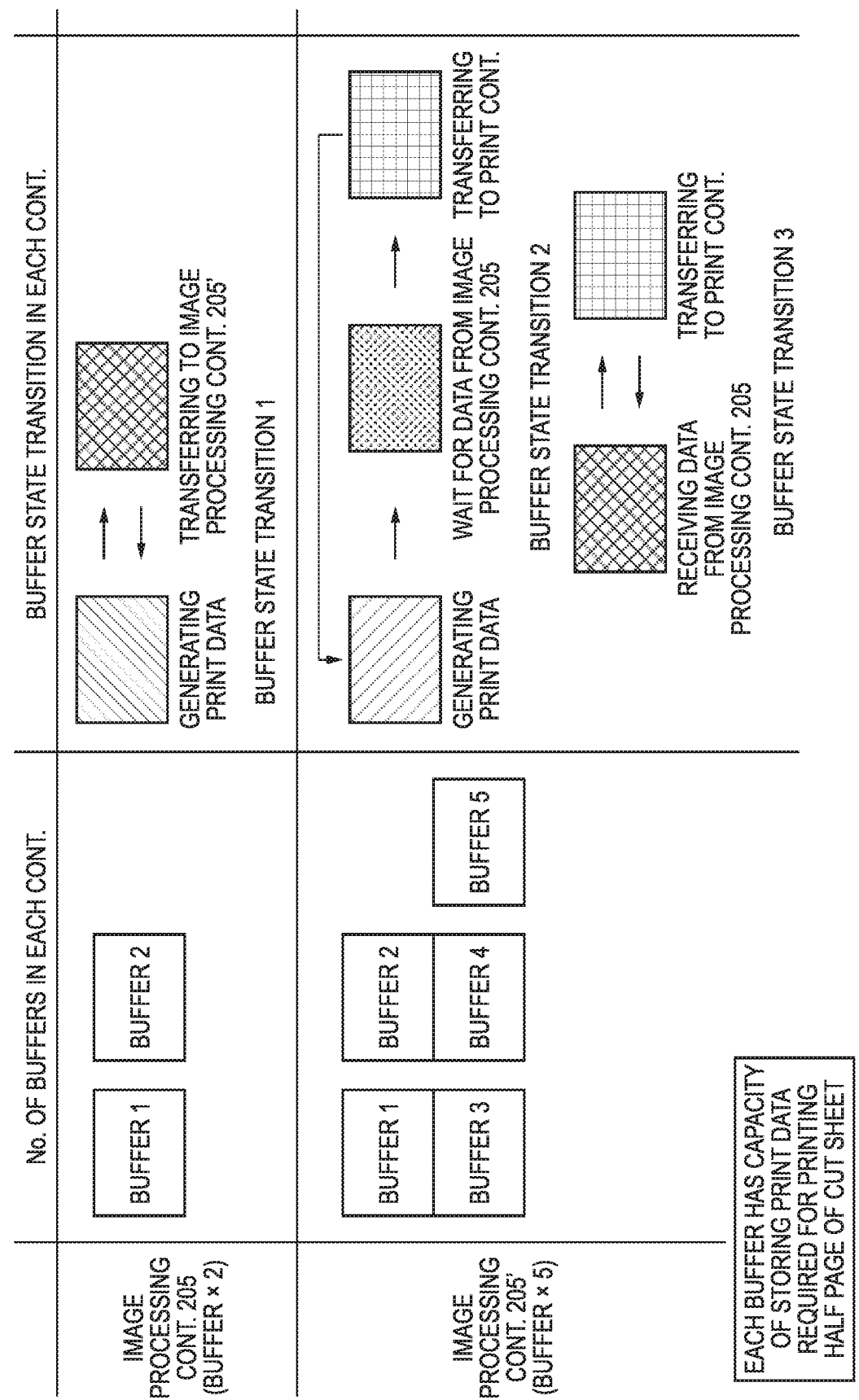
FIG. 7 is a view showing the number of buffers of each of the two image processing controllers, and the states of the buffers and state transition at the time of buffer management in each image processing controller.

FIG. 7 is a view showing the number of buffers of each of the two image processing controllers 205 and 205', and the states of the buffers and state transition at the time of buffer management in each image processing controller.

FIG. 7 shows an example in which the image processing controller 205' can temporarily buffer print data corresponding to printing of three cut sheets. Since the image processing controller 205 and 205' share one page, the unit of the share is set as one buffer management unit. For this unit, as shown in FIG. 7, the image processing controller 205 includes two buffers (buffers 1 and 2) and the image processing controller 205' includes five buffers (buffers 1 to 5).

Buffer management of the image processing controller 205 is indicated by state transition 1 of the buffers, and the state transition includes "generation of print data in progress" and "transfer to image processing controller 205' in progress". Buffer management of the image processing controller 205' is indicated by state transitions 2 and 3 of the buffers. State transition 2 includes "generation of print data in progress", "wait for data from image processing controller 205", and "transfer to print controller in progress". State transition 3 includes "reception of data from image processing controller 205 in progress" and "transfer to print controller in progress".

Figure 8B:
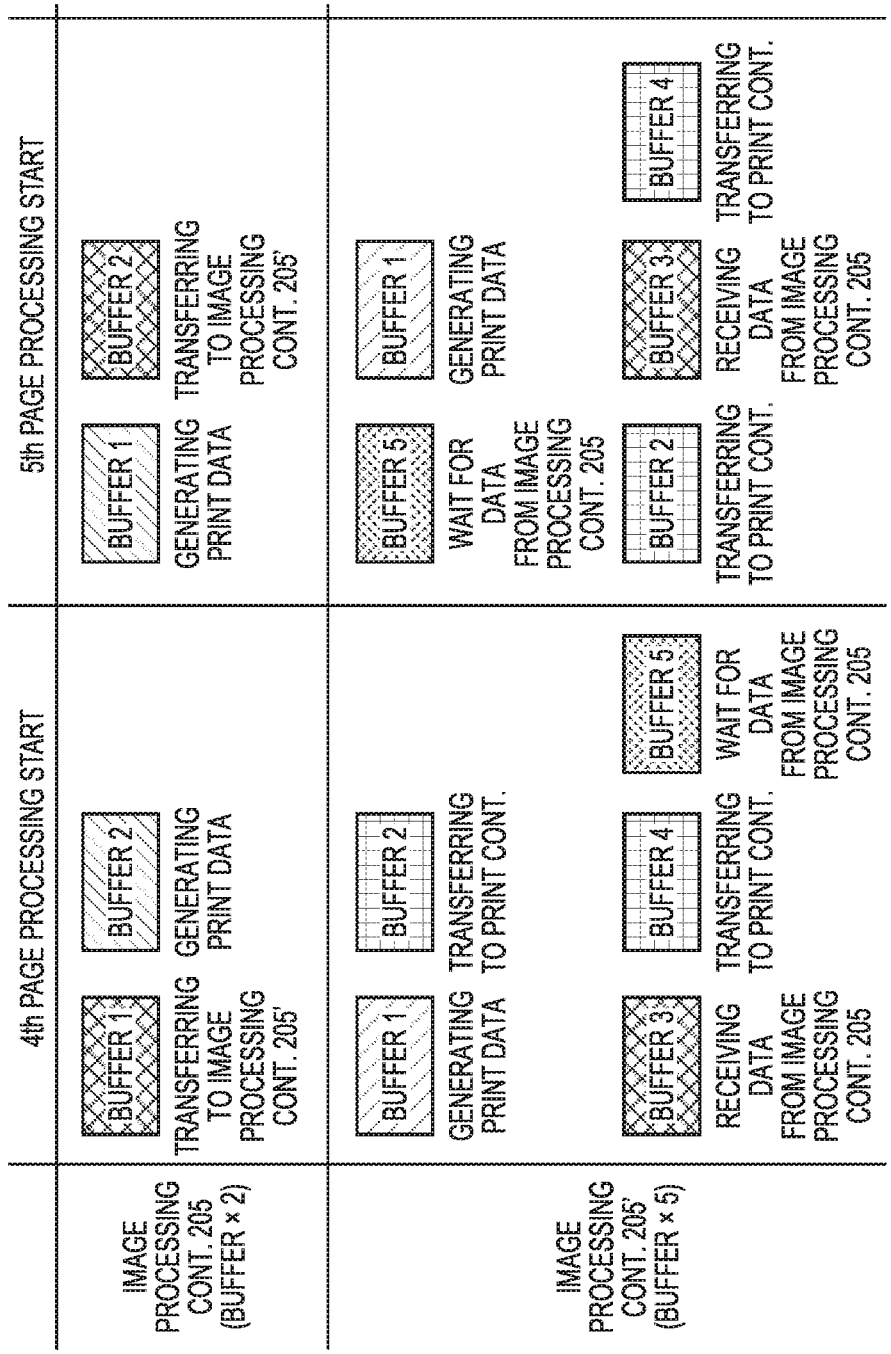

FIGS. 8A and 8B are views exemplifying the state transition of each buffer of each of the image processing controllers 205 an 205' when image data to be used for printing of five cut sheets are processed.

Referring to FIGS. 8A and 8B, in processing of the first page, almost buffers start from an empty state, and only one buffer in each controller changes in state. More specifically, the state changes from the empty state to the state of "generation of print data in progress". In the next page, the state of another buffer changes to "generation of print data in progress", and the buffer in the state of "generation of print data in progress" changes to "transfer to image processing controller 205' in progress" or "reception of data from image processing controller 205 in progress". In the next page, print data for one page are aggregated in the image processing controller 205', and the state of the buffer changes to "transfer to print controller in progress". In this way, each buffer sequentially changes in role for each page.

In the arrangement shown in FIGS. 5A to 6B, the print width is set in the nozzle array direction of the printhead 8.

With respect to the print width, the image processing controller 205 generates print data to be used for printing of the upper half, and the image processing controller 205' generates print data to be used for printing of the lower half. After the end of image processing for each of the upper and lower halves of one cut sheet, the print data for the upper half is stored in the buffer of the image processing controller 205, and the print data for the lower half is stored in the buffer of the image processing controller 205'.

Referring back to FIGS. 8A and 8B, while print data is generated by executing image processing for the image data of the next page, the print data stored in the buffer of the image processing controller 205 is transferred to the buffer of the image processing controller 205'. Then, while print data is generated by executing image processing for the image data of processing of the next page, the image processing controller 205' simultaneously transfers, from the two buffers to the print controller 202, print data obtained by composing the data of the upper and lower halves.

Referring to FIGS. 8A and 8B, in processing of each page, the image processing controller 205' can set two of the five buffers in the state of "transfer to print controller in progress" at the same time. Thus, the above-described DMAC integrated in the image processing controller 205' comprises two DMACs 1 and 2 for DMA data transfer from two buffers.

Note that in this embodiment, the print width of the printhead is equally divided into upper and lower halves, and the two image processing controllers execute the image processing for image data corresponding to the upper and lower halves. However, the processing and the method of dividing the image data are not limited to them. Data may be unequally divided into partial image data and the remaining image data in accordance with the throughputs of the image processing controllers, or three or more image processing controllers may be used to perform parallel processing. In either case, any arrangement capable of aggregating print data generated by the respective image processes in a plurality of buffers in one of the plurality of image processing controllers and performing DMA-transfer of the print data to the RAM of the print controller is adopted.

Figure 9A:
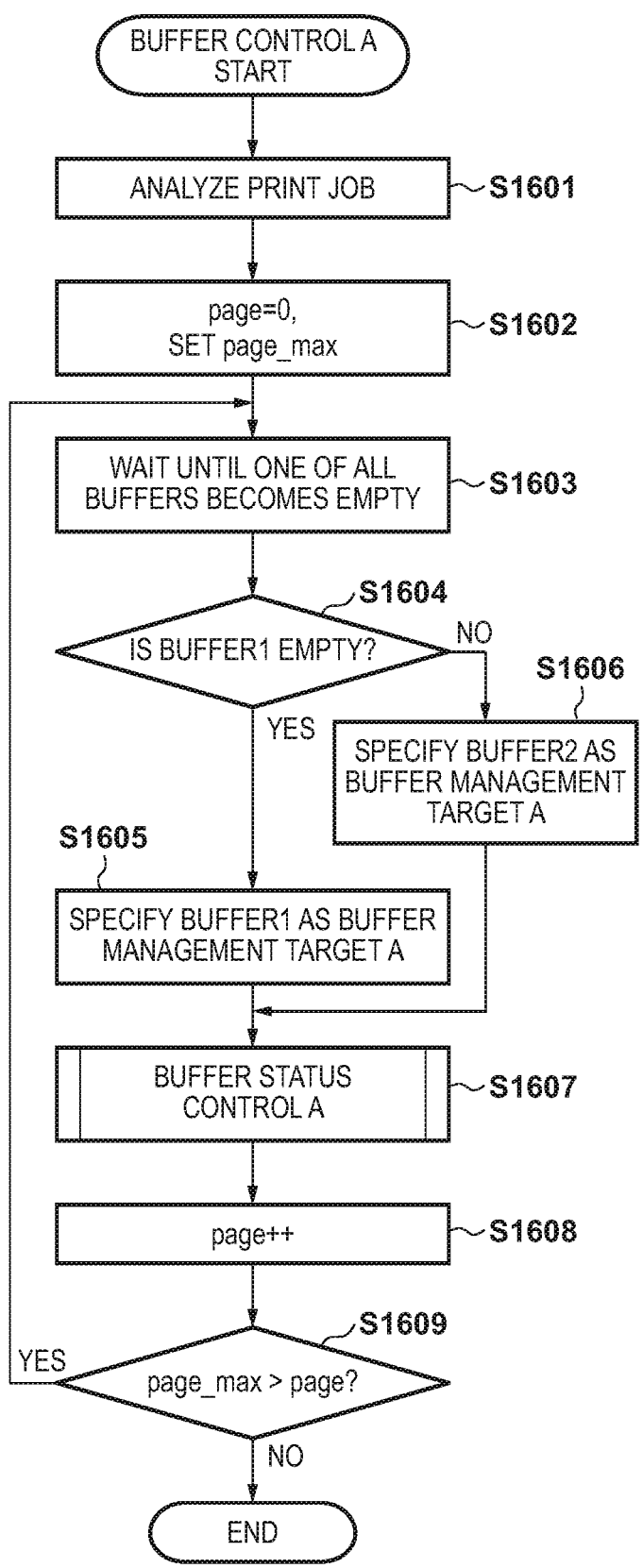
FIGS. 9A and 9B are flowcharts illustrating buffer control and buffer status control for changing the state of buffer management of an image processing controller 205.
Figure 9B:
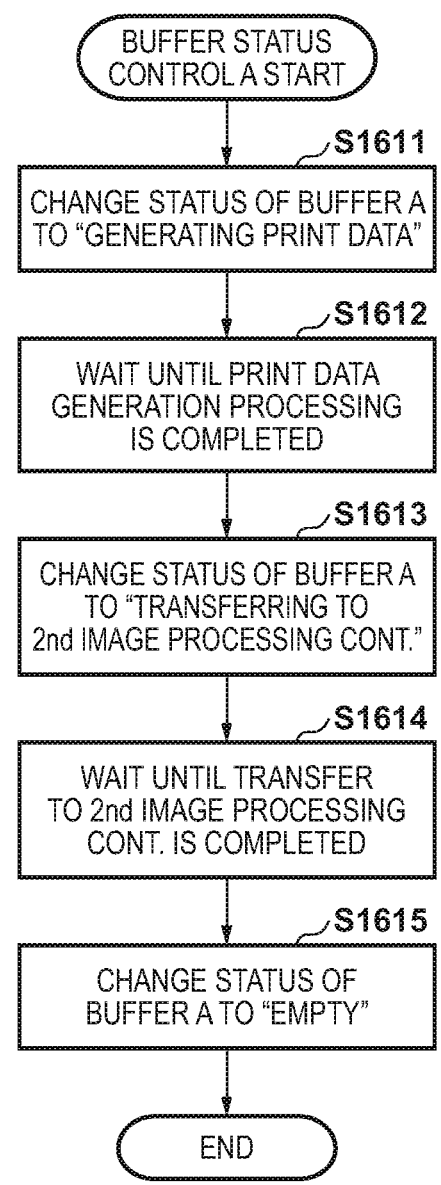

FIGS. 9A and 9B are flowcharts illustrating buffer control (buffer control A) for changing the state of buffer management of the image processing controller 205 and buffer status control (buffer status control A).

In step S1601, a print job is analyzed to obtain the number of pages. In step S1602, a buffer control parameter page is set to "0" and page_max is set to "5". In step S1603, the process waits until one of all the buffers of the image processing controller 205 is set in the empty state (WAIT). If any one of the buffer is set in the empty state, the process advances to step S1604. In step S1604, it is checked whether buffer 1 is in the empty state. If buffer 1 is in the empty state, the process advances to step S1605; otherwise, the process advances to step S1606. In step S1605, buffer 1 is specified as buffer management target A. On the other hand, in step S1606, buffer 2 is specified as buffer management target A.

In step S1607, buffer management target A has been specified, and thus an instruction is issued to perform processing of buffer status control A for the corresponding buffer. After the instruction, the process directly advances to step S1608. In step S1608, "1" is added to the buffer control parameter page, and the process advances to step S1609. In step S1609, it is checked whether page_max is larger than the buffer control parameter page. If page_max>page, the process returns to step S1603. On the other hand, if page- _max≤page (in fact, page_max=page), and it is thus determined that the process has reached the final page, the process ends.

The processing of buffer status control A will be described in detail.

In accordance with the flowchart shown in FIG. 9B, in step S1611, the state of management target buffer A is changed to "generation of print data in progress". In step S1612, the process waits until print data generation processing is completed (WAIT). In step S1613, the state of management target buffer A is changed to "transfer to image processing controller 205' in progress". In step S1614, the process waits until transfer to the image processing controller 205' is completed (WAIT). In step S1615, the state of management target buffer A is changed to "Empty". As described above, state transition 1 of the buffer is implemented.

Figure 10A:
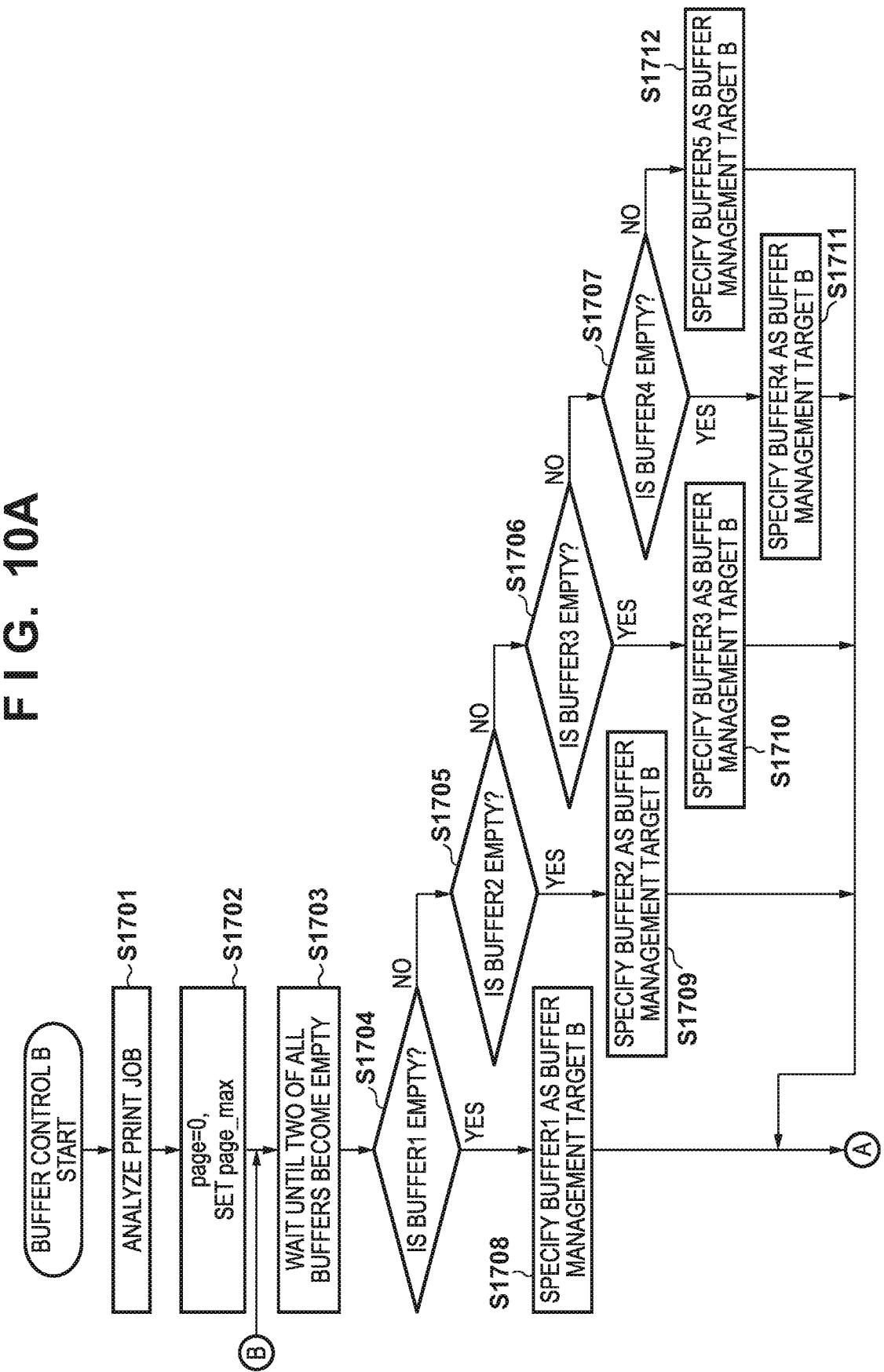

FIGS. 10A and 10B are flowcharts illustrating buffer control for changing the state of buffer management of the image processing controller 205'.

In step S1701, a print job is analyzed to obtain the number of pages. In step S1702, the buffer control parameter page is set to "0" and page_max is set to "5". In step S1703, the process waits until two of all the buffers of the image processing controller 205' are set in the empty state (WAIT). If the buffers are set in the empty state, the process advances to step S1704.

In step S1704, it is checked whether buffer 1 is in the empty state. If buffer 1 is in the empty state, the process advances to step S1708; otherwise, the process advances to step S1705. In step S1708, buffer 1 is specified as buffer management target B. On the other hand, in step S1705, it is checked whether buffer 2 is in the empty state. If buffer 2 is in the empty state, the process advances to step S1709; otherwise, the process advances to step S1706. In step S1709, buffer 2 is specified as buffer management target B. On the other hand, in step S1706, it is checked whether buffer 3 is in the empty state.

If buffer 3 is in the empty state, the process advances to step S1710; otherwise, the process advances to step S1707. In step S1710, buffer 3 is specified as buffer management target B. On the other hand, in step S1707, it is checked whether buffer 4 is in the empty state. If buffer 4 is in the empty state, the process advances to step S1711; otherwise, the process advances to step S1712. In step S1711, buffer 4 is specified as buffer management target B. In step S1712, buffer 5 is specified as buffer management target B.

After the processing in each of steps S1708 to S1712, the process advances to step S1713. In step S1713, buffer management target B has already been specified, and thus an instruction is issued to perform processing of buffer status control B for the corresponding buffer. After the instruction, the process directly advances to step S1714.

In step S1714, it is checked whether buffer 1 is in the empty state. If buffer 1 is in the empty state, the process advances to step S1718; otherwise, the process advances to step S1715. In step S1718, buffer 1 is specified as buffer management target C. On the other hand, in step S1715, it is checked whether buffer 2 is in the empty state. If buffer 2 is in the empty state, the process advances to step S1719; otherwise, the process advances to step S1716. In step S1719, buffer 2 is specified as buffer management target C. On the other hand, in step S1716, it is checked whether buffer 3 is in the empty state. If buffer 3 is in the empty state, the process advances to step S1720; otherwise, the process advances to step S1717. In step S1720, buffer 3 is specified as buffer management target C. On the other hand, in step S1717, it is checked whether buffer 4 is in the empty state.

If buffer 4 is in the empty state, the process advances to step S1721; otherwise, the process advances to step S1722. In step S1721, buffer 4 is specified as buffer management target C. On the other hand, in step S1722, buffer 5 is specified as buffer management target C.

After the processing in each of steps S1718 to S1722, the process advances to step S1723. In step S1723, buffer management target C has already been specified, and thus an instruction is issued to perform processing of buffer status control C for the corresponding buffer. After the instruction, the process advances to step S1724. In step S1724, "1" is added to the buffer control parameter page, and the process advances to step S1725.

In step S1725, it is checked whether page_max is larger than the buffer control parameter page. If page_max>page, the process returns to step S1703. On the other hand, if page_max≤page (in fact, page_max=page), and it is thus determined that the process has reached the final page, the process ends.

FIGS. 11A and 11B are flowcharts respectively illustrating buffer status controls B and C of the image processing controller 205' described with reference to FIGS. 10A and 10B.

Buffer status control B will be described first.

In step S1801, the state of management target buffer B is changed to "generation of print data in progress". In step S1802, the process waits until print data generation processing is completed (WAIT). In step S1803, the state of management target buffer B is changed to "wait for data from image processing controller 205". In step S1804, the process waits until reception of print data from the image processing controller 205 is completed (WAIT).

In step S1805, the state of management target buffer B is changed to "transfer to print controller in progress". In step S1806, the process waits until data transfer to the print controller is completed (WAIT). In step S1807, the state of management target buffer B is changed to "Empty". As described above, state transition 2 of the buffer is implemented.

Next, buffer status control C will be described.

Referring to FIG. 11B, in step S1811, the state of management target buffer C is changed to "reception of data from image processing controller 205". In step S1812, the process waits until reception of data from the image processing controller 205 is completed (WAIT). In step S1813, the state of management target buffer C is changed to "transfer to print controller in progress". In step S1814, the process waits until data transfer to the print controller is completed (WAIT). In step S1815, the state of management target buffer C is changed to "Empty". As described above, state transition 3 of the buffer is implemented.

By executing the control processing shown in FIGS. 9A to 11B described above, it is possible to aggregate the print data having undergone the distributed processing in the RAM of the image processing controller 205' without ensuring, in advance, as physical addresses in the RAM of the image processing controller 205', the area necessary to store the print data. This can reduce one management target buffer in the RAM of the image processing controller 205'.

Subsequently, a method of actually storing this buffer as continuous addresses in the RAM 938 of the print controller 202 will be described.

FIG. 12 is a flowchart illustrating processing when the image processing controller 205' transfers the print data to the print controller 202.

In step S1901, the transfer destination address of management target buffer C is set. More specifically, print control address A of the print data arrangement 2002 shown in FIG. 6B is set in DMA start address A, and print control address C is set in DMA offset address A.

In step S1902, the transfer destination address of management target buffer B is set. More specifically, the print control address B of the print data arrangement 2002 shown in FIG. 6B is set in DMA start address B, and print control address D is set in DMA offset address B.

In step S1903, DMA start address A and DMA offset address A are set in DMAC 1. Furthermore, in step S1904, DMA start address B and DMA offset address B are set in DMAC 2.

Finally, in step S1905, DMACs 1 and 2 are started to start data transfer of the print data to the RAM 938 of the print controller. Thus, the data in which the upper and lower half areas of a page are not allocated at continuous addresses, as indicated by the print data arrangement 2001 shown in FIG. 6A, changes into data in which the upper and lower half areas are allocated at continuous addresses, as indicated by the print data arrangement 2002 shown in FIG. 6B.

Therefore, according to the above-described embodiment, even if the two image processing controllers divide image data for one page into the processing areas and perform parallel processing, it is possible to aggregate the data by efficiently using a memory of a small capacity, and compose the data into one print data before transfer to the printhead.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-058659, filed Mar. 26, 2018, which is hereby incorporated by reference herein in its entirety.

What is claimed is:

1. An image processing apparatus comprising:
    a generation unit configured to generate image data to be used to print an image on a print medium based on a print job transmitted from a host;
    a first image processing unit configured to generate first print data by performing image processing on part of the image data generated by the generation unit, and store the first print data in a first memory;
    a second image processing unit configured to generate second print data by performing image processing on a remaining part of the image data, and store the second print data in a second memory;
    a first transfer unit configured to transfer the first print data from the first memory to the second memory;
    a second transfer unit configured to transfer the first print data and the second print data stored in the second memory to a third memory; and
    a print control unit configured to generate print data to be output for printing on the print medium by a printing unit, based on the first print data and the second print data stored in the third memory,
    wherein the first memory comprises two buffers, one of the two buffers is used for generating the first print data, and the other buffer is used for transferring the first print data to the second memory,
    the second memory comprises a plurality of buffers, one of the plurality of buffers is used for generating the second print data, another buffer of the plurality of buffers is used for receiving the first print from the first memory, and still another two buffers of the plurality of buffers are used for transferring the first print data and the second print data to the third memory,
    the first image processing unit and the first transfer unit are formed by an ASIC,
    the second image processing unit and the second transfer unit are formed by another ASIC, and
    the generation unit and the print control unit are implemented by a processor.

2. The apparatus according to claim 1, wherein
    the second transfer unit uses DMA for data transfer to the third memory, and
    the second transfer unit includes a first DMAC and a second DMAC for DMA-transfer from the other two buffers.

3. The apparatus according to claim 2, wherein the second transfer unit sets, based on the first print data and the second print data stored in the second memory, the first DMAC and the second DMAC for the DMA-transfer so that transfer destination addresses in the third memory as a transfer destination are continuous addresses.

4. The apparatus according to claim 1, wherein
    the print medium is a cut sheet, and
    the generation unit generates image data corresponding to one page of the cut sheet.

5. The apparatus according to claim 1, wherein the print control unit includes the third memory.

6. The apparatus according to claim 1, wherein the first image processing unit includes the first memory.

7. The apparatus according to claim 6, wherein the second image processing unit includes the second memory.

8. The apparatus according to claim 1, wherein the second image processing unit includes the second memory.

9. The apparatus according to claim 1, wherein the print unit is configured to perform printing on a print medium based on print data output from the image processing apparatus.

10. The apparatus according to claim 9, wherein
    the print unit includes:
    a conveyance unit configured to convey the print medium; and
    a printhead configured to print an image by discharging, based on the print data, ink to the print medium conveyed by the conveyance unit.

11. The apparatus according to claim 10, wherein
    the printhead includes a plurality of nozzles each configured to discharge ink,
    the first print data is used for printing by some continuous nozzles of the plurality of nozzles, and
    the second print data is used for printing by remaining continuous nozzles of the plurality of nozzles.

12. The apparatus according to claim 10, wherein the printhead is a full-line printhead having a print width corresponding to a width of the print medium.

13. The apparatus according to claim 1, wherein the second transfer unit transfers the first print data and the second print data stored in the second memory to a continuous address area of the third memory.

14. The apparatus according to claim 13, wherein the print control unit composes the first print data and the second print data in the continuous address area to generate print data to be output for printing on the print medium by the printing unit.

15. The apparatus according to claim 1, wherein a remaining buffer of the plurality of buffers is used for standby for data from the first memory.

16. The apparatus according to claim 1, wherein one of the other two buffers of the plurality of buffers is used for transferring the first print data to the third memory, and a remaining one of the other two buffers of the plurality of buffers is used for transferring the second print data to the third memory.

17. An image processing method comprising:
generating, by a processor, image data to be used to print an image on a print medium based on a print job transmitted from a host;
generating, by a first ASIC, first print data by performing image processing on part of the generated image data, and storing the first print data in a first memory;
generating, by a second ASIC, second print data by performing image processing on a remaining part of the image data, and storing the second print data in a second memory;
transferring, by the first ASIC, the first print data from the first memory to the second memory;
transferring, by the second ASIC, the first print data and the second print data stored in the second memory to a third memory; and
generating, by another processor, print data to be output for printing on the print medium by a print unit, based on the first print data and the second print data stored in the third memory,
wherein the first memory comprises two buffers, one of the two buffers is used for generating the first print data, and the other buffer is used for transferring the first print data to the second memory, and
wherein the second memory comprises a plurality of buffers, one of the plurality of buffers is used for generating the second print data, another buffer of the plurality of buffers is used for receiving the first print data from the first memory, and still another two buffers of the plurality of buffers are used for transferring the first print data and the second print data to the third memory.

18. The method according to claim 17, wherein
DMA is used for data transfer to the third memory, and
a first DMAC and a second DMAC are provided for DMA-transfer from the other two buffers.

19. The method according to claim 18, wherein based on the first print data and the second print data stored in the second memory, the first DMAC and the second DMAC are set for the DMA-transfer so that transfer destination addresses in the third memory as a transfer destination are continuous addresses.

20. The method according to claim 17, wherein
the print medium is a cut sheet, and
in the generating, image data corresponding to one page of the cut sheet is generated.

* * * * *